July 10, 1951 A. N. GOLDSMITH 2,560,168

COLOR TELEVISION SYSTEM

Filed Dec. 31, 1946

INVENTOR
ALFRED N. GOLDSMITH
BY H. S. Grover.
ATTORNEY

Patented July 10, 1951 2,560,168

UNITED STATES PATENT OFFICE 2,560,168

COLOR TELEVISION SYSTEM

Alfred N. Goldsmith, New York, N. Y., assignor to Radio Corporation of America, a corporation of Delaware Application December 31, 1946, Serial No. 719,349

7 Claims. (Cl. 178—5.2)

Figure 1:
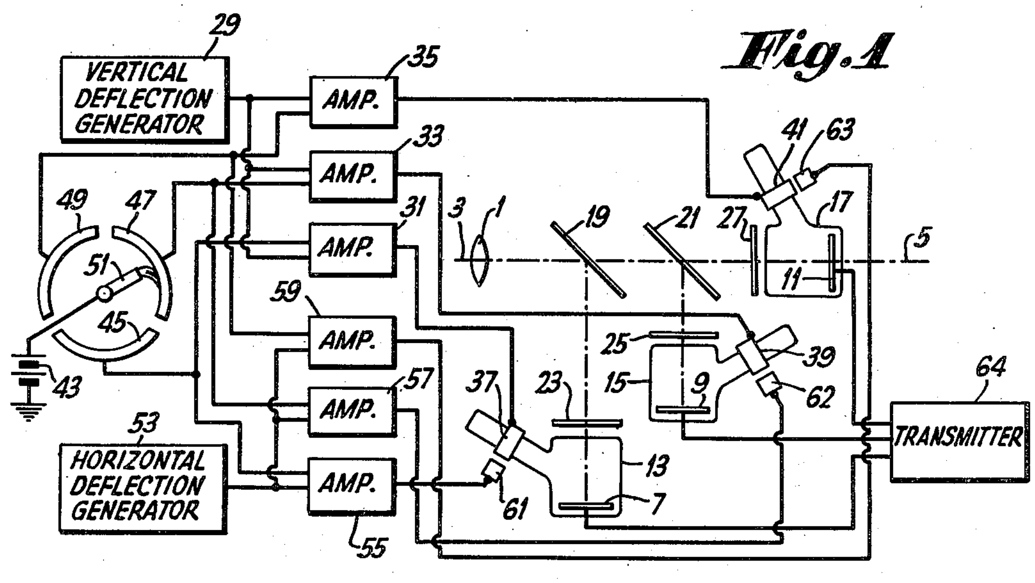

This invention relates to color television systems and more particularly to the transmission and reception of multicolor television images wherein the camera tubes are exposed to the image at all times but cyclically scanned in each case at intervals, and wherein the receiver image producing tubes have prolonged persistence extending beyond the normal scanning time of the usual cathode ray image producing tube and are adapted to present as simultaneous-type color images those transmitted cyclically, simultaneously or in combined fashion.

In presently used cyclic color television processes, a single iconoscope or other form of storage type camera tube (such as the so-called image iconoscope, the "orthicon" or the image "orthicon") is exposed in succession to images giving color separation corresponding to the various selected component colors. During the period that the camera tube is exposed to each color component image, the mosaic is concurrently scanned in well understood manner to enable the transmission of signals representing the corresponding color separation image. Thus, each color separation or color component image contains, so to speak, a record only of motion falling within the corresponding color separation and mosaic scanning period. Any motion occurring between one scanning of the camera tube mosaic corresponding to a given color and the next scanning corresponding to the same color will not be registered in that color and cannot therefore appear as a blur or image extension in the next scanning for that color. Thus, in conventional systems, color action fringes are inevitably produced, and this is particularly objectionable when objects at no great distance from the television camera lens move fairly rapidly perpendicularly to the optical axis of the camera lens.

In the conventional cyclic multicolor television receiver, a given kinescope or image producing tube of low light persistence on the tube target or screen is used. A black-and-white image is produced thereon which corresponds to each given color component, this image being viewed or projected through a color filter of a component color corresponding to the desired component color instantaneously to be represented, and such an image representation persists substantially only during the period of the scanning of the fluorescent screen of the kinescope for that color component image. The process is then repeated for the next color component and so on, with different component color filters successively coming between the tube screen and the observer. Thus, a brief flashing of each color component image recurs cyclically with spaces in between which are filled by the brief presentation or flashing of other component color images. Such a procedure inherently leads to color action fringes for obvious reasons and particularly with low repetition rates of color fields results in considerable color flicker, especially for bright objects of defined color, and unless the field frequency is raised to very high values leading to the requirement of a very broad frequency band for the transmission, the resulting images must be of low light intensity to be enjoyed.

According to this invention, each component color camera is exposed at all times to the moving image in one of its component colors only. Consequently, each scanning of each color-component camera tube, even though cyclically repeated with intervals between such scannings for a given color, contains and registers all motion of the image occurring between successive scannings. Accordingly, color action fringes, while not absolutely eliminated as in the case of simultaneous multicolor television, are nevertheless greatly reduced through the integrating effect of time. The reduction results from the softening of outlines of moving objects in each of the color component images for each scanning corresponding to the natural effect of such motion, to the reduction in brightness of the instantaneous positions of the edges of moving objects, and to the softening or "graying," so to speak, of all color overlaps in moving objects. That is, in place of brilliant, sharply defined color action fringes, smoothed or extended motional blurs of a natural type are obtained, with reduced saturation and decreased conspicuousness of any color fringes or areas in images or objects in motion.

This invention is therefore of importance in minimizing the limitations of cyclic multicolor television. It may be added that it can be used at the transmitting end of the system in collaboration with conventional cyclic multicolor television receivers; or alternatively it may be used at the receiving end of the system in suitable form in collaboration with conventional cyclic multicolor television transmitters. Thus the system requires no inherent change in cyclic color television standards, but does improve the effectiveness of the system in each instance.

The procedure followed in the practice of this invention reduces color action fringes in reception as well as transmission, and also reduces flicker in transmission and reception, and particularly in the latter. Thus either an improved image can be produced in substantially the same frequency band as for high fidelity black and white images or, alternatively, the frequency band may be somewhat narrowed for acceptable image transmission.

According to this invention in one of its preferred forms, three kinescopes or other forms of cathode ray image producing tubes are provided in a tricolor receiver system. On each of the kinescopes there is produced cyclically and in sequence one of the tricolor component color images. These images are produced, in general, in identical sizes and centerings as well as identical vertical and horizontal linearities or deflections. By color filtering or otherwise, each component color image so produced is caused to be of a color corresponding to one of the given color components, into which an image at the transmitter is analyzed. Suitable optical means are used for superimposing the three separate component color images so that an observer may view three superimposed and registered images according to usual additive color methods, or the three images may be simultaneously projected in registration. Thus a replica of the original color image is reproduced.

Usual electromechanical cyclic receivers or equivalent receiver will not receive simultaneous transmission, nor will the normal simultaneous system receive cyclic transmission without a distributor, and even with such a distributor it would not efficiently do so without increased storage period and selectively radiating phosphors.

The transmitter or receiver can readily be changed from cyclic to simultaneous or combined type system by, for example, using separate channels for each component color signal. It will be seen that such flexibility reduces the chances of early obsolescence resulting from change in standards.

A primary object of this invention is to provide an improved color television system.

Another object of this invention is to reduce color action fringes in multicolor cyclic television systems.

Still another object is to include universal adaptability of transmitting and receiving systems.

A further object of this invention is to reduce color flicker in multicolor cyclic television systems.

A still further object is to increase the light efficiency in sequential color television systems.

Figure 2:
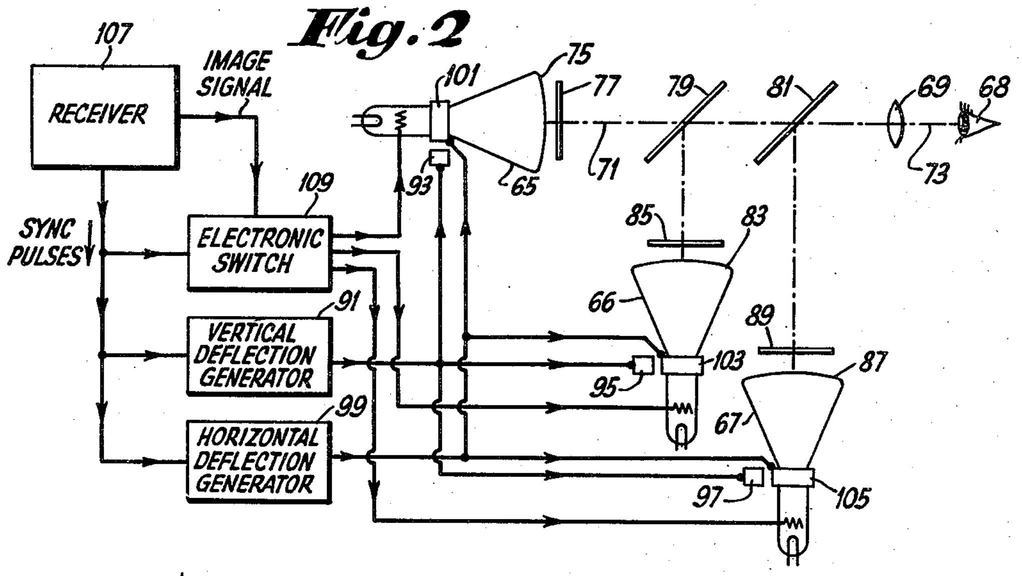
Figure 3:
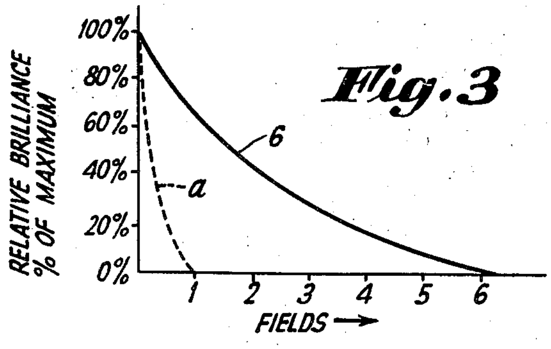

Other and incidental objects of the invention will be apparent to those skilled in the art from a reading of the following specifications and an inspection of the accompanying drawing in which Figure 1 illustrates in block diagram the transmitting portion of one preferred form of this invention;

Figure 2 shows also in block diagram the receiving portion utilized in the practice of one preferred form of this invention; and Figure 3 illustrates graphically the operation of one form of this invention.

Referring now in more detail to Figure 1, objective lens 1 having optical axis 3, 5 focuses a light image of external subjects on the mosaic electrodes 7, 9 and 11 of the iconoscope or other suitable camera tubes 13, 15 and 17. The theory and performance of the iconoscope is quite well known in the art and is well described in an article entitled "Theory and Performance of the Iconoscope," by V. K. Zworykin, G. A. Morton, and L. E. Flory in the "Proceedings of the Institute of Radio Engineers," for August, 1937, beginning on page 1071. Other so-called storage types of camera tubes have likewise been described in literature and are now well known.

In order to provide a similar size image for each of the mosaic electrodes 7, 9 and 11, an optical beam splitting means is provided and consists of partial light reflectors 19 and 21. Appropriate light filters 23, 25 and 27 provide the necessary color separation required for the reproduction of images in their natural color. Although a combination of reflectors and filters is shown, color selective reflectors of superior optical efficiency and of the type shown and described in the U. S. Patent 2,412,496 to Glenn L. Dimmick, granted December 10, 1946, may be employed, and it will be understood that the particular means of obtaining the separate component color images is not a part of this invention, except in combination with other components.

Color selective reflectors generally include multi-layer interference films, alternate layers being of material of high and low index of refraction respectively. In reflectors of this type, each layer has a thickness of one quarter of the wave length of light of a predetermined color; the low index layers tend to reduce reflection from the surface bearing the film, while the high index layers increase reflection. The reflector as a whole is thus given selective characteristics, that is to say, it transmits a substantial proportion of light of one color while reflecting a substantial proportion of light of another color.

By employing the color separation device illustrated in Figure 1 or the color separation device referred to above, three separate images, each of a component color, are focused on mosaic electrodes 7, 9 and 11.

The mosaic electrodes 7, 9 and 11 may be designed so that each of them is particularly sensitive to the color of the image focused on them.

The optical arrangement shown in Figure 1 would, so far as optics are concerned, give considerably greater pickup sensitivity than a single camera tube utilizing the conventional rotating color filter. This results from the fact that each of the component color camera tubes is exposed to the image continuously rather than for one third of the time, as is true in the conventional sequential color system. For example, if we consider the conventional system wherein a rotating tricolor filter is used with a single camera tube or image producing tube having an interlaced scanning raster, it may be assumed that the tube will receive $\frac{1}{12}$ of the available light for $\frac{1}{3}$ of the time, or $\frac{1}{36}$ of the available light. If, however, there is employed in the practice of this invention a system of color selective reflectors of superior optical efficiency and of the type referred to above, it may be assumed, for example, that $\frac{1}{4}$ or $\frac{1}{5}$ of the available light will be utilized for full time, thus providing seven to nine times as much light by the utilization of a system constructed in accordance with the teachings of this invention. By utilizing color sensitized camera tubes in the practice of this invention, the overall sensitivity of the system may be still further increased and therefore be of much greater sensitivity than a single camera tube behind the conventional rotating color filter in which the camera tube must be sensitive substantially equal to all visible colors.

As has been explained above, each camera tube is operated sequentially and cyclically, and for each scanning tube a single scanning operation occupies one third of the time from the beginning of one scanning to the beginning of the next succeeding scanning.

The vertical or field deflection generator 29 (of any suitable known type) is connected to each of three separate conventionally represented amplifiers 31, 33 and 35, which are each adapted to carry the deflection voltages to the corresponding vertical deflection yokes 37, 39 and 41 of camera tubes 13, 15 and 17, respectively.

Each of the amplifiers 31, 33 and 35 is provided with a biasing connection whereby an activating bias voltage originating, for example, from source 43 may be cyclically applied in sequence to each of the amplifiers 31, 33 and 35. The time of application of the activating voltage for each amplifier is equal to the time of scanning of a single color field; and the time between the beginning of successive applications of the activating voltage to each amplifier is three times the color field duration. Furthermore, the vertical or field deflection generator 29 and the commutating means shown in Figure 1 are synchronously interlocked, for example, by driving from a given power source for the vertical deflection generator 29 and by synchronous-motor operation of the commutating device with the motor driven from the same power source or a thereto related power source.

The commutator is schematically indicated by the three segments 45, 47 and 49. The activating potential 43 is applied through brush 51 to the segments 45, 47 and 49 by synchronous rotation of the brush 51 in the direction indicated.

While a mechanical commutator is shown, and may in fact be a simple and convenient form for the purpose, yet it must be understood that any electrical circuit arrangement capable of producing three square potential waves cyclically may be substituted. These square potential waves must begin with the respective field scannings initiated by the vertical deflection generator 29 and must have a duration equal to one color field, and their beginnings must be separated by three color fields in duration. Square wave generators of various types are well known in the art. A typical multivibrator keying circuit is shown and described beginning on page 403 of the book, "Principles of Television Engineering," by Donald G. Fink, published in 1940.

Similarly, the output of horizontal or line deflection generator 53 is passed through the three amplifiers 55, 57 and 59, and thence to the horizontal deflecting elements or yokes 61, 62 and 63 of the camera tubes 13, 15 and 17 respectively.

The amplifiers 55, 57 and 59 are activated respectively by the application of the activating potential 43 through the commutating device in the same fashion as previously described in connection with the output of vertical or field deflection generator 29.

The vertical or field and the horizontal or line deflection generators 29 and 53 are also well known in the art and may, for example, take the form of the deflection generator shown and described in the patent to W. A. Tolson et al., No. 2,101,520, granted December 7, 1937.

Transmitter 64 is shown in block and may take any of the conventional forms.

While six amplifiers are actually shown, these amplifiers can, in fact, be combined to provide the vertical and horizontal deflection control voltage necessary to accomplish the desired bidirectional scanning operations.

Figure 2 illustrates a natural color television receiver wherein three image tubes 65, 66 and 67 are optically arranged so that light passing from each of the image tubes 65, 66 and 67 is combined optically to form a single registered color image, viewable by the eye 68 or projected by the objective lens 69 on a suitable screen. 71, 73 is the optical axis of the system.

Light from the screen 75 of image tube 65 passes through the component color filter 77 and to the objective lens 69 through the partially reflecting mirrors 79 and 81.

Light from screen 83 of image tube 66 passes through the component color filter 85 to partially transmitting and partially reflecting mirror 79. The reflected portion then passes along the optical path 71, 73 to the objective lens 69.

Likewise, light from screen 87 of image tube 67 passes through its associated component color filter 89 to partially transmitting and partially reflecting mirror 81 and thence to objective lens 69.

Where the three images are homologous in size and placement in all their parts, they will form a registered color image.

Multi-layer color selective reflector systems may also be employed in the receiver. Selective reflectors were referred to in more detail above in connection with the explanation of the system shown in Figure 1.

Vertical or field deflection of the cathode ray beam within each image tube is provided by vertical or field frequency deflection generator 91, which provides appropriate deflection voltages for vertical deflection elements 93, 95 and 97 of image tubes 65, 66 and 67, respectively.

Synchronizing pulses for driving the field or vertical deflection generator 91 and the line or horizontal deflection generator 99 in synchronism with the transmitting station are obtained from receiver 107 which also furnishes image signal to electronic switch 109.

Electronic switch 109 is designed and operated such that the image tubes 65, 66 and 67 are operated singly and cyclically. By applying the image signal together with an appropriately keyed bias to the control electrodes of image tubes 65, 66 and 67, each of the image tubes may be made operative only during predetermined time intervals. Electronic switches are well known in the art and may, for example, take the form of the electronic switch referred to above and shown and described beginning on page 403 of "Principles of Television Engineering," by Donald G. Fink, published in 1940.

It will be seen that by keeping each component color signal channel separate, such as, for example, employing three separate transmitters 64 or three separate subcarrier frequencies, each representative of a component color signal, and stopping distributor 51 to permit simultaneous action of camera tubes 13, 15 and 17, a simultaneous transmitting system for television color results. Likewise, by keeping each component color signal channel separate in the receiving system and stopping electronic switch 109, the system shown in Figure 2 may be efficiently employed for the reception of simultaneous color television signals.

The storage capabilities of the image producing tubes 65, 66 and 67 reduce color fringe and color flicker. Accordingly, a receiver of the type illustrated in Figure 2 will reproduce images transmitted from typical present day cyclic tricolored transmitters with less color flicker and action fringes than would appear in the cyclic electromechanical or selective filter type of receiver conventionally used for such transmissions and employing necessary kinescopes of relatively short luminescent persistence.

However, the full capabilities of systems of the type herein described for the reduction of color flicker and action fringes are even more fully realized when receivers of the type shown in Figure 2 are used to reproduce images produced by transmitters of the type shown in Figure 1. The employment of a receiver of the type shown in Figure 2 with normal present day cyclic transmitters will produce images having less color flicker and action fringes than will result from the employment of the present cyclic receivers with short persistence receiver screens. The inclusion of the popular interlace scanning raster will further improve the overall operation of the system.

In order to increase the efficiency of the pickup system shown in Figure 1, it is preferred to use for the mosaics 7, 9 and 11 photosensitive materials having their maximum, and as nearly exclusive as possible, sensitivity within the range of colors of the light respectively incident thereon. The combined chromatic sensitivity of each mosaic, considered in conjunction with the color of the light reflected from filter 17 or 21 (or transmitted through 17 and 21, respectively) and passing through supplementary filters 23, 25 and 27, respectively, should correspond to the desired color response curve for the additive color system therein employed.

Where each of the image producing tubes employs a highly efficient phosphor producing light of a color close to that of the corresponding color filter, the luminous efficiency of the system may be still further substantially increased, and a brighter image may be produced than could be obtained from a single black and white kinescope with the conventional rotating color filter.

The screens of the image tubes comprise a luminescent screen material or phosphor which is the means for converting electrical energy of the cathode ray beam into light. The efficiency of this conversion and its persistence depends to a large extent upon the cathode ray screen material. The persistence characteristic of a screen discloses its brilliancy variation with the time of phosphorescence or its light emission after excitation. Its light emission during excitation is termed fluorescence.

Heretofore the persistence of television image tube screens has been adjusted to a point where flicker could be satisfactorily eliminated. In such a case, it was only necessary to have a screen whose persistence was long enough to provide for illumination during the scanning of a single field.

According to a preferred form of this invention, however, the persistence of the image tube screen is sufficient to carry over through the scanning operation of all the three component colors.

According to another preferred form of this invention, the transmitter and/or receiver tube storage for an $n$-color image should be greater than $n$ and less than $2n$ times the time interval occupied by one component color.

A typical persistence curve is illustrated in Figure 3, wherein curve $a$ illustrates the persistence curve utilized in television systems heretofore, and curve $b$ illustrates the persistence curve suitable for use in the practice of this invention.

Of the many materials used for cathode ray tube screens, the one probably best known is a silicate such as synthetic willemite. This is crystalline zinc orthosilicate containing a small portion of manganese. It is fairly typical of the silicates in particular, and of the so-called "activated" luminescent materials in general. The pure base material (zinc orthosilicate) is not luminescent, but becomes so upon the inclusion in its crystal structure of a small amount of some foreign substance (manganese, in this case), which is called the activator. There is an optimum concentration of the activator for maximum light production efficiency; a large excess of activator produces a material which is completely insensitive to cathode rays. The optimum concentration of a given activator varies for different crystalline bases. Silicates may be formed by heating together suitable proportions of a metal oxide, an oxide of the activator, silica, and a flux. These preparations are usually quite stable and not easily harmed by heating in any atmosphere.

A second group of luminescent materials may be classified as sulphides. The sulphides of various bivalent metals can be made luminescent by the presence of activators in the same way as can the silicates; copper is one of the most effective activators. Its optimum concentration, however, is so very small that ordinary "chemically pure" sulphide samples may contain enough copper to suppress the luminescence. The process of manufacture is, therefore, begun by purifying a soluble salt of the metal whose sulphide is to be prepared; this is done to remove the excess of copper and certain heavy metals, such as iron and lead, which render the sulphide nonluminescent. The sulphide may be precipitated from the purified solution. This preparation is mixed with suitable fluxes, sufficient activator is added to bring the total percentage up to the optimum, and the mixture is fused in a controlled atmosphere to prevent oxidation of the sulphide. The product is crystalline and usually more resistant to chemical attack than the corresponding sulphide in the amorphous state.

By properly selecting the material, a suitable image tube screen for the practice of this invention may be made.

Additional detail regarding luminous screens may be found in an article by T. B. Perkins and H. W. Kaufmann, entitled "Luminescent Materials for Cathode Ray Tubes," beginning on page 1324 of the "Proceedings of the Institute of Radio Engineers" for November, 1935.

The cathodoluminescent art is reviewed by H. W. Leverenz in an article entitled "Cathodoluminescence as Applied in Television," beginning on page 131 of "RCA Review" for October, 1940. There is a comprehensive discussion of persistence and cathodoluminescence emission spectra of several single and dual activated sulphide phosphors.

On page 235 of an article entitled "Luminescence and Tenebrescence as Applied in Radar" by H. W. Leverenz, beginning on page 199 of "RCA Review" for June, 1946, there is a chart giving a compilation of data for some CRT, an extract from which is listed below. The type screens listed below are intended to be illustrative only; other type screens may, of course, be employed in the practice of this invention.

| RMA No. | Composition | Color | Decay time to 1% (sec.) |
|---|---|---|---|
| | ZnO:(n) | Green-white | $10^{-6}$ |
| P5 | $CaWO_4$:(W) | Blue | $10^{-5}$ |
| P11 | α*-ZnS:Ag | do | .005 |
| P4, P6 | ZnS:Ag+ZnS:CdS:Ag | White | .001+.005 (Y) (B) |
| P4 | α*-ZnS:Ag+$Zn_8BeSi_5O_{19}$:Mn | do | .005+.06 (B) (Y) |
| P1 | $Zn_2SiO_4$:Mn | Green | .05 |
| P3 | (α) $Zn_gBeSi_5$O19:Mn | Yellow | .06 |
| P12 | Zn(Mg)F2:Mn | Orange | .4 |
| P2 | ZnS:Cu(Ag) | Green | .3 |
| | (β*) ZnS:CdS:Ag:Cu | Yellow-green | 1 |
| P14 | (EMI) β*—ZnS:Ag on ZnS(75):CdS:Cu | White / Orange | 1 |
| (P9) | $Cs_2P_2O_7$:Dy (GEC Ltd.) | White | 2 |
| P7, (P8) | β*—ZnS:Ag on ZnS(86):CdS:Cu | do / Yellow | 3 |
| P10 | KCl | Magenta on white | 5 |
| | Stable phosphor | (any phosphor color) | 1 to 10 |

While the invention is illustrated in a particular tricolor embodiment, it should be understood that it is equally applicable to any color television system in which two or more component color images are used for analysis and synthesis of the pictures, and includes as well those cases where, in addition to color components, there are also picked up and reproduced monochrome, that is, black and white television picture components.

From what has gone before it will now become particularly evident that in utilizing the presently disclosed method and system the hitherto accepted and necessary limitations of sequential multicolor systems which required a short persistence luminescent target for the image reproducer tube and a mosaic target in which the charge storage period at the camera tube was no greater than one scanning field period, all as above set forth in detail, have been completely avoided. There has been deliberately substituted therefor a different type of storage wherein image storage or luminous persistence over several scanning fields is desired and introduced into the system. It is this break with previous practice which enables the herein described system to avoid in considerable measure the deficiencies of present sequential color television and, in fact, somewhat to approach the freedom from color flicker and color action fringes inherent in correctly engineered simultaneous color television systems.

These improvements are derived from what may be termed the integration of images in motion resulting from the increased storage capacity of the camera tube and the increased persistence of the reproducing image tube. As already pointed out herein, however, either of these last-mentioned arrangements may be separately used while thus deriving at least partial benefits from the integration process herein described. Accordingly, within the meaning of this invention, for reference purposes and particularly in the claims, the period of effective activity of any tube described will be understood as applying equally to the storage and integrating characteristics of the image pickup camera tube or to the hereinbefore explained elongated periods of luminescent persistence of the receiver or monitoring image reproducing tube. Likewise, within the meaning of this invention, a television scanning tube will be understood from what has gone before to refer either to an image pickup or camera tube at the transmitter end of the system or an image reproducing tube at the receiver or monitoring end of the system.

Having thus described the invention, what is claimed is:

1. A color television system employing a number of different component colors and comprising in combination a plurality of image areas, means including scanning beams for scanning each of said image areas in recurring field scanning sequences, said image areas having elements with a decay time greater than the time interval occupied by a single scanning sequence, means to present on said image areas formed component color images of each of the component colors substantially at all times as elements of said color images, and means to control the separate scanning of said areas in selected order to prolong the optical and electrical effects at the target areas thereof accordingly.

2. A multicolor television system comprising, in combination, a plurality of television scanning tubes each having a target area arranged to be scanned by a cathode ray beam in recurring field scanning sequences, each of said target areas having a period of effective activity which is greater in time interval than that time occupied by a single field scanning sequence so that over any selected plurality of field scanning sequences the effects produced at the tube target areas become substantially integrated and cumulative, and distributor means to control the separate scanning tubes in selected order to prolong the optical and electrical effects at the target areas thereof correspondingly.

3. A color television system employing a number of different component colors and comprising in combination a plurality of image areas adapted to be scanned in recurring field scanning sequences, said image areas having elements with a decay time greater than the time interval occupied by a single scanning sequence, means to present on said image areas formed component color images of each of the component colors substantially at all times as elements of said color images, and means including scanning beams for scanning each of said component color images in field sequence.

4. A color television system employing a number of different component colors and comprising in combination an image area for each of said component colors, means comprising scanning beams for scanning each of said image areas in recurring field scanning sequences, each of said scanned areas composed of persistence elements with a decay time greater than the time interval occupied by a single field scanning, means to present on each of said image areas different formed component color images of each of the selected component colors substantially at all times as elements of said color images, an electron beam for each of said component colors, and means for extinguishing during any one time interval all of said electron beams with the exception of the one of said electron beams which is scanning any one of said component color images.

5. A color television receiving system employing a plurality of different component colors and comprising in combination an image area for each of said different component colors, each of said image areas and means comprising scanning beams for scanning each of said image areas in recurring field scanning sequences, said image areas having persistently luminous elements with a presistence greater than the time interval occupied by a single field scanning, means to present on each of said image areas different formed component color images of each of the component colors substantially at all times as elements of said color images means for activating said scanning beams in sequence.

6. A color television transmitting system employing a plurality of different component colors and comprising in combination an image area for each of said component colors, said image areas means comprising scanning beams for scanning each of said image areas in recurring field scanning sequences, said image areas composed of a mosaic of energy storing elements with a persistence greater than the time interval occupied by a single field scanning, means to present on said image areas different formed component color images of each of the component colors substantially at all times as elements of said color images and means comprising scanning beams for scanning each of said image areas.

7. A color television system employing a number of different component colors and comprising in combination a plurality of image areas, each of said areas adapted to be scanned by a scanning beam in recurring field scanning sequences, each of said scanned areas composed of persistence elements with a decay time permitting at least 50 percent retention during the time interval occupied by a single field scanning, means to present on each of said image areas formed component color images of each of the component colors substantialy at all times as elements of said color images, an electron beam for each of said component colors, and means for extinguishing during any one time interval all of said electron beams, with the exception of the one of said electron beams which is scanning any one of said component color images.

ALFRED N. GOLDSMITH.

REFERENCES CITED

The following references are of record in the file of this patent:

UNITED STATES PATENTS

| Number | Name | Date |
|---|---|---|
| 2,310,863 | Leverenz | Feb. 9, 1943 |
| 2,313,224 | Cawein | Mar. 9, 1943 |
| 2,333,969 | Alexanderson | Nov. 9, 1943 |
| 2,335,180 | Goldsmith | Nov. 23, 1943 |
| 2,389,039 | Goldsmith | Nov. 13, 1945 |
| 2,389,646 | Sleeper | Nov. 27, 1945 |
| 2,389,979 | Huffnagle | Nov. 27, 1945 |
| 2,423,769 | Goldsmith | July 8, 1947 |
| 2,423,830 | Fonda | July 15, 1947 |